United States Patent
Ta et al.

(10) Patent No.: US 10,284,240 B2
(45) Date of Patent: May 7, 2019

(54) RECEIVING CIRCUIT AND WIRELESS COMMUNICATION DEVICE

(71) Applicant: KABUSHIKI KAISHA TOSHIBA, Minato-ku (JP)

(72) Inventors: Tuan Thanh Ta, Kawasaki (JP); Tong Wang, Kawasaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 0 days.

(21) Appl. No.: 15/881,987

(22) Filed: Jan. 29, 2018

(65) Prior Publication Data

US 2019/0089390 A1    Mar. 21, 2019

(30) Foreign Application Priority Data

Sep. 19, 2017  (JP) .................................. 2017-179444

(51) Int. Cl.
*H04B 1/04* (2006.01)
*H04B 1/10* (2006.01)
(Continued)

(52) U.S. Cl.
CPC ................. *H04B 1/10* (2013.01); *H04B 1/04* (2013.01); *H04B 1/16* (2013.01); *H04B 1/40* (2013.01); *H04B 2001/0408* (2013.01)

(58) Field of Classification Search
CPC ... H04B 1/10; H04B 1/16; H04B 1/04; H04B 1/40; H04B 2001/0408
See application file for complete search history.

(56) References Cited

U.S. PATENT DOCUMENTS

| 3,593,154 | A | * | 7/1971 | Blass | ...................... | H03D 7/18 |
| | | | | | | 455/179.1 |
| 5,737,035 | A | * | 4/1998 | Rotzoll | .................. | H03D 7/161 |
| | | | | | | 348/725 |

(Continued)

FOREIGN PATENT DOCUMENTS

| EP | 0478306 A1 | * | 4/1992 | ............. | H05B 41/28 |
| EP | 0478306 A1 | * | 4/1992 | ............. | H05B 41/28 |

(Continued)

OTHER PUBLICATIONS

Tomohiro Sano, et al., "A 6.3mW BLE Transceiver Embedded RX Image-Rejection Filter and TX Harmonic-Suppression Filter Reusing On-Chip Matching Network," IEEE International Solid-State Circuits Conference, 2015, pp. 240-242.

(Continued)

*Primary Examiner* — Berhanu Tadese
(74) *Attorney, Agent, or Firm* — Oblon, McClelland, Maier & Neustadt, L.L.P.

(57) ABSTRACT

A receiving circuit includes a first inductor, a second inductor, a capacitor and an amplifier. The first inductor includes a first terminal and a second terminal. The second inductor includes a third terminal and a fourth terminal. The first terminal is configured to couple with an antenna for receiving a first electrical signal corresponding to an electromagnetic wave received by the antenna. The second terminal is configured to output a second electrical signal based on the first electrical signal. The first capacitor includes a fifth terminal coupled to the third terminal and a sixth terminal coupled to the fourth terminal. The amplifier is coupled to the second terminal and configured to amplify the second electrical signal.

13 Claims, 10 Drawing Sheets

(51) Int. Cl.
 *H04B 1/16* (2006.01)
 *H04B 1/40* (2015.01)

(56) References Cited

U.S. PATENT DOCUMENTS

| | | | | |
|---|---|---|---|---|
| 6,177,964 B1* | 1/2001 | Birleson | H03D 7/161 | 348/725 |
| 6,714,776 B1* | 3/2004 | Birleson | H03D 3/009 | 455/302 |
| 6,850,747 B1* | 2/2005 | Imbornone | H03H 7/0115 | 348/729 |
| 6,907,231 B2* | 6/2005 | Bhatti | H04B 1/0458 | 455/121 |
| 7,079,195 B1* | 7/2006 | Birleson | H03D 7/161 | 348/725 |
| 7,245,186 B2* | 7/2007 | Chang | H03F 3/191 | 327/552 |
| 7,274,410 B2* | 9/2007 | Birleson | H03D 7/161 | 348/731 |
| 7,453,527 B2* | 11/2008 | Birleson | H03D 7/161 | 348/731 |
| 7,526,256 B2* | 4/2009 | Bhatti | H04B 1/006 | 333/25 |
| 7,538,621 B2* | 5/2009 | Birleson | H03D 7/161 | 331/117 D |
| 7,633,355 B2* | 12/2009 | Matsuo | H04B 1/18 | 333/17.3 |
| 7,746,412 B2* | 6/2010 | Birleson | H03D 7/161 | 348/731 |
| 8,139,161 B2* | 3/2012 | Birleson | H03D 7/161 | 348/731 |
| 8,237,531 B2* | 8/2012 | Qiu | H01F 17/0006 | 336/200 |
| 8,315,336 B2* | 11/2012 | Sorrells | H03F 1/0294 | 330/126 |
| 8,548,093 B2* | 10/2013 | Sorrells | H03F 1/0294 | 330/126 |
| 8,571,496 B2* | 10/2013 | Mizokami | H03F 1/301 | 330/277 |
| 8,880,010 B2* | 11/2014 | Ballantyne | H04J 11/0023 | 455/114.2 |
| 8,913,691 B2* | 12/2014 | Sorrells | H03F 1/0294 | 375/297 |
| 9,306,502 B2* | 4/2016 | Chan | H03F 3/189 | |
| 9,602,065 B2* | 3/2017 | Mizokami | H03F 1/565 | |
| 9,866,178 B2* | 1/2018 | Anderson | B82Y 10/00 | |
| 9,991,855 B2* | 6/2018 | Mizokami | H03F 1/565 | |
| 10,063,205 B2* | 8/2018 | Mizokami | G01R 25/04 | |
| 2006/0001492 A1* | 1/2006 | Chang | H03F 3/191 | 330/306 |
| 2006/0221256 A1* | 10/2006 | Birleson | H03D 7/161 | 348/725 |
| 2006/0256242 A1* | 11/2006 | Birleson | H03D 7/161 | 348/725 |
| 2007/0182866 A1* | 8/2007 | Birleson | H03D 7/161 | 348/725 |
| 2007/0205849 A1* | 9/2007 | Otis | H03D 3/34 | 333/187 |
| 2007/0287403 A1* | 12/2007 | Sjoland | H03D 7/145 | 455/326 |
| 2008/0285681 A1* | 11/2008 | Sorrells | H03F 1/0294 | 375/297 |
| 2009/0002255 A1* | 1/2009 | Kato | H01Q 9/30 | 343/861 |
| 2009/0066847 A1* | 3/2009 | Birleson | H03D 7/161 | 348/725 |
| 2010/0061432 A1* | 3/2010 | Ben-Hamo | H04N 5/455 | 375/222 |
| 2010/0231305 A1* | 9/2010 | Mizokami | H03F 1/301 | 330/310 |
| 2010/0265412 A1* | 10/2010 | Birleson | H03D 7/161 | 348/731 |
| 2011/0158346 A1* | 6/2011 | Ballantyne | H04B 1/525 | 375/296 |
| 2012/0256684 A1* | 10/2012 | Sorrells | H03F 1/0294 | 330/69 |
| 2014/0050124 A1* | 2/2014 | Yang | H04B 1/10 | 370/278 |
| 2014/0062574 A1* | 3/2014 | Sorrells | H03F 1/0294 | 327/355 |
| 2014/0071571 A1* | 3/2014 | Tseng | H04B 5/0037 | 361/91.1 |
| 2014/0113828 A1* | 4/2014 | Gilbert | H01L 39/126 | 505/100 |
| 2015/0055514 A1* | 2/2015 | Ballantyne | H04B 1/525 | 370/278 |
| 2015/0117565 A1* | 4/2015 | Sorrells | H03F 1/0294 | 375/295 |
| 2016/0072443 A1* | 3/2016 | Mizokami | H03F 1/565 | 330/295 |
| 2016/0182003 A1* | 6/2016 | Teshima | H03H 7/38 | 455/73 |
| 2016/0336983 A1* | 11/2016 | Wang | H04B 1/1027 | |
| 2017/0019135 A1* | 1/2017 | Kwok | H04B 1/1027 | |
| 2017/0070199 A1* | 3/2017 | Anderson | B82Y 10/00 | |
| 2017/0077877 A1* | 3/2017 | Anderson | B82Y 10/00 | |
| 2017/0104456 A1* | 4/2017 | Motoi | H03F 3/217 | |
| 2017/0149393 A1* | 5/2017 | Mizokami | H03F 1/565 | |
| 2017/0201218 A1* | 7/2017 | Wang | H03F 1/565 | |
| 2017/0244442 A1* | 8/2017 | Mizokami | H04B 1/48 | |
| 2018/0115291 A1* | 4/2018 | Mizokami | G01R 25/04 | |
| 2018/0226367 A1* | 8/2018 | Babcock | H03F 3/195 | |

FOREIGN PATENT DOCUMENTS

| | | | | |
|---|---|---|---|---|
| JP | 2004-221648 | | 8/2004 | |
| JP | 5852229 | | 2/2016 | |
| JP | WO 2016030942 A1 * | | 3/2016 | H04B 1/48 |
| JP | 5950051 | | 7/2016 | |
| WO | WO 2016/030942 A1 | | 3/2016 | |
| WO | WO-2016030942 A1 * | | 3/2016 | H04B 1/48 |

OTHER PUBLICATIONS

Harish Krishnaswamy, et al., "Inductor- and Transformer-based Integrated RF Oscillators: A Comparative Study," IEEE Custom Integrated Circuits Conference (CICC), 2006, pp. 381-384.

Donghyun Baek, et al., "Analysis on Resonator Coupling and its application to CMOS Quadrature VCO at 8 GHz," IEEE Radio Frequency Integrated Circuits Symposium, 2003, pp. 85-88.

* cited by examiner

RECEIVING CIRCUIT AND WIRELESS COMMUNICATION DEVICE

CROSS-REFERENCE TO RELATED APPLICATIONS

This application is based upon and claims the benefit of priority from Japanese Patent Application No. 2017-179444, filed on Sep. 19, 2017; the entire contents of which are hereby incorporated by reference.

FIELD

Embodiments described herein relate generally to a receiving circuit and a wireless communication device.

BACKGROUND

For the sake of cost reduction and miniaturization, on-chip integration is proceeding in the field of short-range wireless communication such as Bluetooth. The demand for on-chip integration is high especially for image rejection filters used for filtering received signals. In on-chip integration, even if the overall area of circuit is reduced, performance needs to be within satisfactory levels.

Conventional image rejection filters that include inductors consumed large areas. The area of circuit can be reduced by sharing the image rejection filter with the matching circuit of power amplifier. However, power amplifiers with high output have low impedances. Therefore, it is difficult to make the impedance of matching circuit match with the high impedance of image rejection filters. If matching circuits with the impedance of image rejection filters are used, it would put a limit to the output of power amplifiers that can be used. Also, it is difficult to improve the overall performance, if some sections of circuits are shared.

Generally, the distance between the resonant frequency and the anti-resonant frequencies is inversely proportional to the quality factor of the LC resonant circuit. Thus, if on-chip inductors with low quality factors are used, it is difficult to place the resonant frequency and the anti-resonant frequency in close frequency ranges. If the image frequency is within the vicinity of the reception frequency, it becomes difficult to eliminate interfering waves in the image frequency.

DETAILED DESCRIPTION

According to one embodiment, a receiving circuit includes a transformer and a first capacitor. The transformer includes a first inductor in a primary side and a second inductor in a secondary side. The first capacitor is connected in parallel to the second inductor. A received signal enters from an edge of the first inductor.

Hereinafter, embodiments of the present invention will be described with reference to the drawings.

First Embodiment

Figure 1:
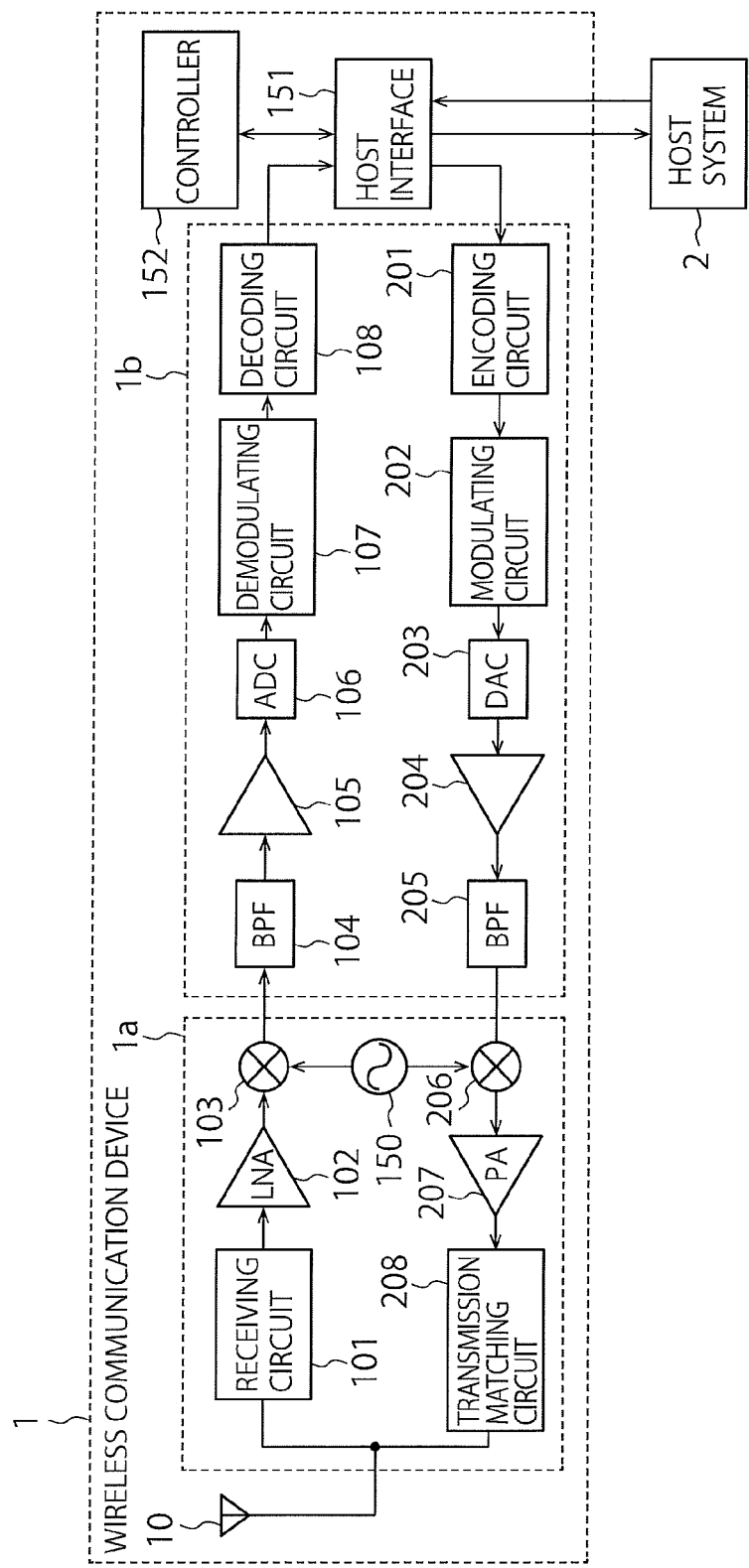
FIG. 1 is a block diagram showing a schematic configuration of a wireless communication device according to a first embodiment.

FIG. 1 is a block diagram showing a schematic configuration of a wireless communication device according to a first embodiment. A wireless communication device according to a first embodiment will be described with reference to FIG. 1.

A wireless communication device 1 is electrically connected to a host system 2. The wireless communication device 1 sends data from the host system 2 using wireless communication. The host system 2 can be a tablet, a personal computer, a smartphone, a conventional cellular phone, a mouse, a keyboard, a printer, a scanner, an audio device, a video game machine, a digital camera, a video camera, a smartwatch, a healthband, a navigation system, business machinery, a medical monitor, a POS terminal, a terminal for merchandise management, an emergency transmitter, a telemetry transmitter, a robot with sensors or the like.

The wireless communication device 1 is a wireless communication device compliant to Personal Area Network (PAN) standards such as Bluetooth, Bluetooth Low Energy or the like. The wireless communication device 1 can comply with other standards such as ZigBee, Z-Wave, Wireless USB or NFC (Near Field Communication) standards or the like.

The wireless communication device 1 includes an antenna 10, a RF unit 1a, a baseband unit 1b, a host interface 151 and a controller 152. All of the above components or part of the above components can be implemented in a single semiconductor chip or a package.

The antenna 10 is connected electrically to the RF unit 1a. The antenna 10 transmits electric signals sent by the RF unit 1a as radio waves. Also, radio waves received by the antenna 10 proceed to the RF unit 1a in the form of electric signals.

The number of the antenna 10 is only one for the drawing in FIG. 1. However, the wireless communication device 1 can include a plurality of antennas.

The antenna 10 is not limited to an antenna of specific size or form. The antenna 10 can be implemented within the wireless communication device 1. The antenna 10 can be located in the exterior of the wireless communication device 1. The antenna 10 can be an array antenna.

The RF unit 1a includes a receiving circuit 101, low-noise amplifier 102, a mixer 103, a local oscillator 150, a mixer 206, a power amplifier 207 and a transmission matching circuit 208.

The RF unit 1a converts signals received by the antenna 10 from radio frequency to baseband frequency. The converted signal proceeds to the baseband unit 1b. The RF unit 1a converts signals sent from the baseband unit 1b from baseband frequency to radio frequency. The converted signal is transmitted via the antenna 10. In the example illustrated in FIG. 1, conversion between radio frequency and baseband frequency is done directly. However, the wireless communication device 1 may convert signals in radio frequency to intermediate frequency.

The RF unit 1a can use a fixed radio frequency. It can also switch the radio frequency according to some sequence. Such switching of radio frequency is called frequency hopping. If frequency hopping is used, the hopping sequence is shared with the other wireless communication device.

The receiving circuit 101 has two roles. One role is the impedance matching circuit for signals entering the low-noise amplifier 102. The second role is the notch filter which rejects undesired frequency elements such as the image frequency. Details of the receiving circuit 101 is described later.

The low-noise amplifier 102 amplifies the received signals. The mixer 103 in the receiving side, the mixer 206 in the transmitting side and the local oscillator 150 are used for frequency conversion. If the radio frequency is changed, the oscillating frequency of the local oscillator 150 is adjusted. The implementation of the local oscillator 150 is not limited to a specific design. Also, the numbers of the mixer 103, the mixer 206 or the local oscillator 150 are not limited to one. There can be a plurality of above components. The power amplifier 207 amplifies the transmitted signal. The transmitted signal then passes through the transmission matching circuit 208 and is transmitted by the antenna 10.

The baseband unit 1b includes a bandpass filter 104, an amplifier 105, an A/D converter 106, a demodulating circuit 107, a decoding circuit 108, a encoding circuit 201, a modulating circuit 202, a D/A converter 203, an amplifier 204 and a bandpass filter 205.

The bandpass filter 104, the amplifier 105, the A/D converter 106, the demodulating circuit 107 and the decoding circuit 108 are related to the data receiving function of the baseband unit 1b.

The bandpass filter 104 eliminates undesired frequency elements of the received signal which is down-converted to the baseband frequency. The amplifier 105 amplifies the elements of the received signal selected within a specific frequency range. The A/D converter 106 converts the analog received signal to digital signals. The demodulating circuit 107 demodulates the digitalized received signal. The decoding circuit 108 decodes the data included in the digitalized received signal.

The encoding circuit 201, the modulating circuit 202, the D/A converter 203, the amplifier 204 and the bandpass filter 205 are related to the data transmission function of the baseband unit 1b.

The encoding circuit 201 encodes the data to be transmitted and generates the transmitted signal in digital format. The modulating circuit 202 modulates the transmitted signal. The D/A converter 203 coverts the transmitted signal from digital to analog signals. The amplifier 204 amplifies the transmitted signal. The bandpass filter 205 eliminates undesired frequency elements within the transmitted signal.

The implementation illustrated in FIG. 1 is using a D/A converter and a mixer to transmit signals. However, the transmission circuit can be implemented differently. For example, the oscillator can be connected directly to the power amplifier used for amplifying transmitted signals.

Any of the modulation/demodulation schemes and encoding/decoding schemes can be used in the baseband unit 1b. Examples of modulation/demodulation schemes include Frequency Shift Keying (FSK), BPSK, QAM or the like. Any type of circuit can be used for the A/D converter 106 and the D/A converter 203.

The host interface 151 enables communication of electric signals between the wireless communication device 1 and the host system 2. Examples of the host interface 151 include PCI Express, USB, UART, SPI, SDIO or the like. Any of the other interfaces can be used as the host interface 151.

The controller 152 configures the wireless communication device 1. Configuration tasks that can be done by the controller 152 include changing transmission outputs, changing receiving frequencies, switching modulation/demodulation schemes, changing encoding schemes or the like. The controller 152 may have functions for detecting frequency elements to be rejected, including the image frequency, the frequencies of thermal noise, the frequencies of the interfering waves. The controller 152 also controls the switches in the circuits. It can also configure parameters for the variable capacitors and the variable inductors. Details of the control operations are mentioned later.

In the implementation illustrated in FIG. 1, the wireless communication device 1 has only a single controller. However, the wireless communication device 1 can have more than one controller. If there are a multiple controllers, certain tasks or configurations can be assigned to each controller. The controller can be implemented in the RF unit 1a or the baseband unit 1b. The controller can be implemented in any other location.

Components included in the RF unit 1a and the baseband unit 1b can be implemented using hardware circuitry such as semiconductor circuits, FPGAs, PLDs, ASICs or the like. The above components can be implemented with firmware operating on microprocessors. Also, a combination of hardware circuitry and firmware can be used.

The wireless communication device 1 illustrated in FIG. 1 is only an example. Therefore the allocation and numbers of filters, mixers and amplifiers can be different from FIG. 1. The wireless communication device 1 may be a super-heterodyne system, Low-IF (Low-Intermediate Frequency) system, sliding-IF system, directly connected system, digital phase-locked loop system or any other system.

Next, the image frequency elements generated during frequency conversion is explained. Below, a case when the radio frequency signal is converted to baseband frequency is shown.

Let the radio frequency be $f_r$ and the oscillation frequency of the local oscillator be $f_{LO}$. If signals of frequency $f_r$ and $f_{LO}$ are multiplied in the mixer 103, the following equation (1) holds.

$$\sin\omega_r t \cdot \sin\omega_{LO} t = \frac{1}{2}\cos(\omega_r - \omega_{LO})t - \frac{1}{2}\cos(\omega_r + \omega_{LO})t \quad (1)$$

Here, the relations $\omega_r=2\pi f_r$ and $\omega_{LO}=2\pi f_{LO}$ hold. Right side of equation (1) implies that signals of frequencies $f_h=f_r+f_{LO}$ and $f_l=|f_r-f_{LO}|$ are generated in the mixer 103. For baseband frequency $f_{BF}$, either the signal of frequency $f_h$ or frequency $f_l$ may be used. Here, signal of frequency $f_l$ is selected by using components such as the bandpass filter 104.

The frequency elements generated around the frequency $f_l$ is called the image frequency $f_i$. Image frequency $f_i$ is a different frequency element from the radio frequency $f_r$. For the image frequency $f_i$, the equation $f_i=2*f_{LO}-f_r$ holds. Since the image frequency $f_i$ signal is converted to frequency elements within the vicinity of the baseband frequency $f_{BF}$ and the radio frequency $f_r$ signal, there is a risk of interference with the radio frequency $f_r$ signals. Therefore, it is common for wireless communication devices that use intermediate frequencies to have filters that reject image frequencies within the receiving circuits.

Figure 2:
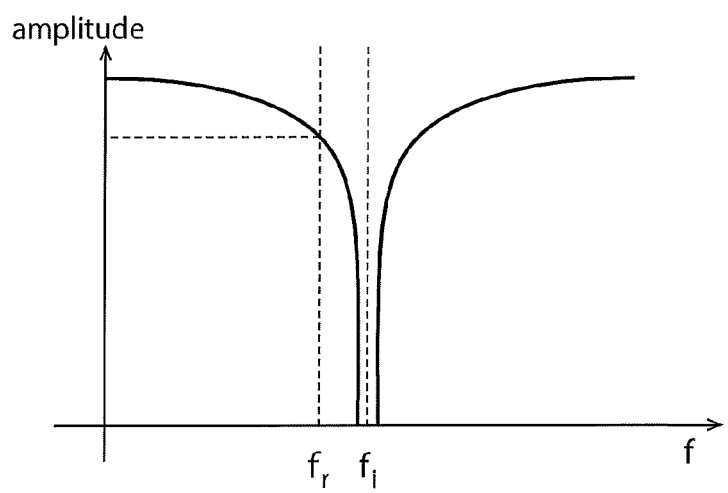
FIG. 2 shows frequency characteristics of image rejection filters.
Figure 2:
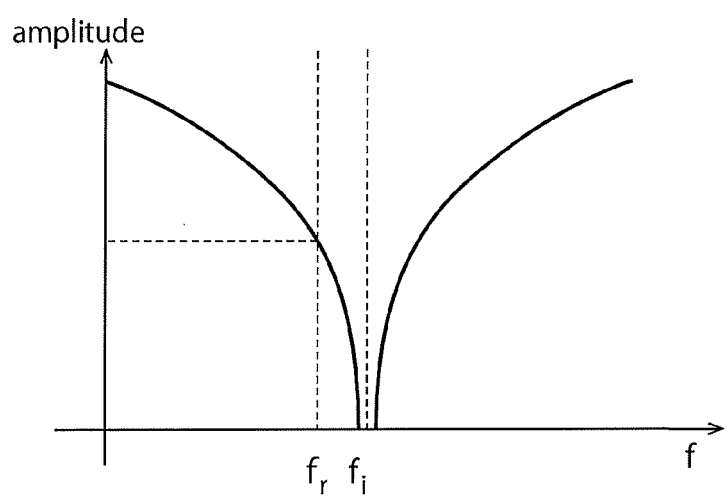

Notch filters (band rejection filters or bandstop filters) can be used as image rejection filters. To minimize impact to the receiving frequencies, a notch filter with a high quality factor is desired. FIG. 2 illustrates shows frequency characteristics of image rejection filters. In FIG. 2, there are two graphs. One graph is illustrated in the top and another graph is illustrated in the bottom. The vertical axes represent the amplitude of signal. The horizontal axes represent the frequency of signal. The dashed line show the image frequency $f_i$.

The graph illustrated in the top of FIG. 2 is the frequency response of an image rejection filter with a high quality factor. The graph illustrated in the bottom of FIG. 2 is the frequency response of an image rejection filter with a low quality factor. A filter with the response illustrated in the top graph of FIG. 2 exhibits a steep frequency characteristic. Therefore, only the frequency elements of the image frequency $f_i$ are rejected and loss of frequency elements surrounding the image frequency $f_i$ is minimal. However, a filter with the response illustrated in the bottom graph of FIG. 2 presents a gradual curve. In this case, even the frequency elements that are distant from the image frequency $f_i$ are rejected.

Conventional on-chip image rejection filters had quality factors of about 10. Therefore, the performance of filter was insufficient. When the on-chip image rejection filters of the related art were used, even the frequency elements of the receiving signals were rejected, degrading reception performance if the receiving frequency is close to the image frequency.

On-chip image rejection filters of the related art consume large areas, using inductors. Since magnetic fields occur within the proximity of the inductor, prohibited regions needs to be allocated. Within the prohibited regions, no circuit element can be placed. If a large proportion of the chip belongs to the prohibited region, it would put a limitation to the functions that could be implemented. Thus, there is a demand for image rejection filters that do not consume excess areas within the circuit.

The quality factors of the image rejection filters depend on the image frequency $f_i$. A filter which is capable of rejecting image frequency elements effectively for a certain range of frequency may have difficulty rejecting image frequency elements for a different range. If communication standards such as Bluetooth with non-constant image frequencies are used, the quality factor needs to be sufficiently high for multiple image frequencies. If the radio frequency hops, the corresponding image frequency would be different for each radio frequency. Thus, there would be multiple image frequencies.

To resolve the issues described above, a receiving circuit using a transformer is used in the embodiment. Here, a transformer helps rejecting image frequency elements. Details of the circuit according to the embodiment is described later.

Figure 3:
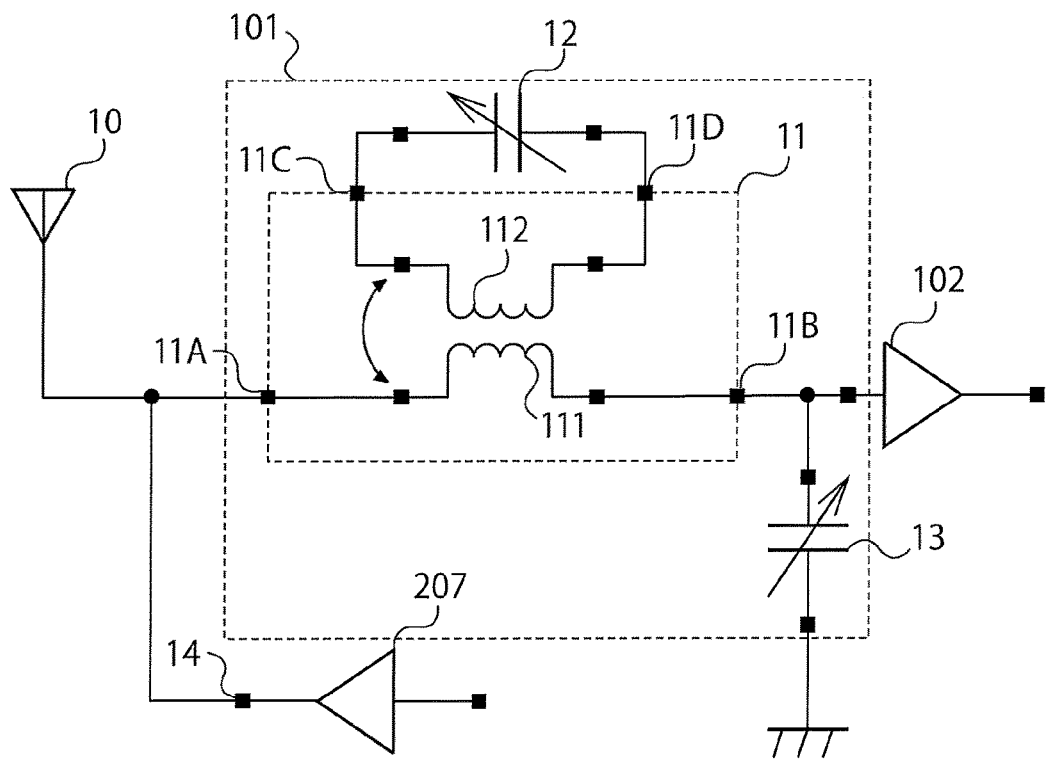
FIG. 3 is an implementation of circuit according to the first embodiment.

FIG. 3 is an implementation of circuit according to a first embodiment. FIG. 3 corresponds to the antenna 10, the receiving circuit 101, the low-noise amplifier 102 and the power amplifier 207 of FIG. 1. In FIG. 2 the transmission matching circuit 208 is not illustrated. However, a matching circuit can be inserted between the antenna 10 and the power amplifier 207. Below, details of the circuit will be described with reference to FIG. 3.

The circuit illustrated in FIG. 2 includes the antenna 10, a transformer 11, a capacitor 12, a capacitor 13, the low-noise amplifier 102 and the power amplifier 207. The transformer 11 is an on-chip transformer including an inductor 111 in the primary side and an inductor 112 in the secondary side. Both the inductor 111 and the inductor 112 are on-chip inductors. The inductor 111 has the terminal 11A in one edge and the terminal 11B in another edge. The inductor 112 has terminals 11C in one edge and the terminal 11D in another edge. The inductor 111 and the inductor 112 may be inductors with fixed inductance. The inductor 111 and the inductor 112 can also be inductors with variable inductance.

The capacitor 12 is an on-chip capacitor with variable or fixed capacitance. The capacitor 12 is connected between the terminal 11C and the terminal 11D. Also, between the terminal 11B and ground, the capacitor 13 is connected. The ground illustrated in FIG. 3 can be the reference potential of the whole circuit or the reference potential of the analog circuit.

The capacitor 13 is also an on-chip capacitor with variable or fixed capacitance. Details on variable capacitors with variable capacitance is described later. The terminal 11B of the inductor 111 is also connected to the input terminal of the low-noise amplifier 102. For the capacitor 12 and the capacitor 13, it is possible to use variable capacitors whose capacitance changes according to the voltage applied to the terminals. Depending on the impedance of the low-noise amplifier, the capacitor 13 may be omitted.

The antenna 10 and the power amplifier 207 are connected to the terminal 1A of the inductor 111. Although not illustrated in FIG. 3, it is possible to insert a matching circuit (the transmission matching circuit 208) in the location of the terminal 14, if impedance matching is required between the antenna 10 and the power amplifier 207.

Next, the function of circuit illustrated in FIG. 3 is described.

Signals received in the antenna 10 will enter the receiving circuit via the terminal 11A. For image frequency signals, the transformer 11 and the capacitor 12 forms a parallel-resonant circuit, increasing the input impedance. The parallel-resonant circuit prevents the image frequency signals from penetrating into the low-noise amplifier 102.

For signals in the receiving frequency, the transformer 11 and the capacitor 12 have high quality values. Therefore, for the receiving frequency, the transformer 11 and the capacitor 12 can be described as being equivalent to a single inductor with small loss. Detailed explanations will be given later.

Figure 4:
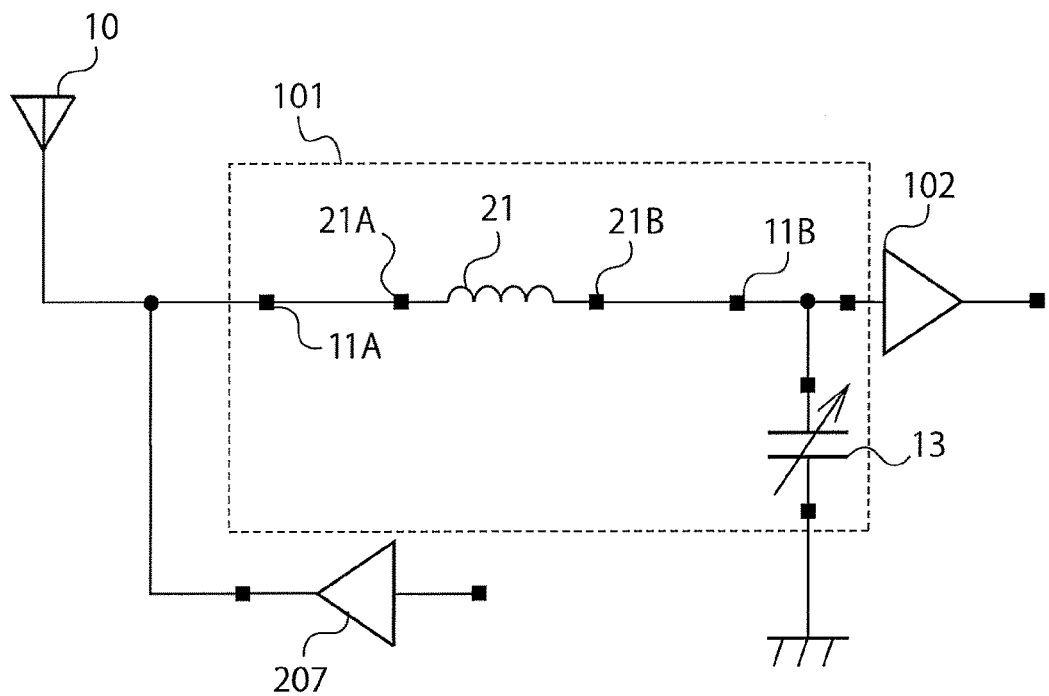
FIG. 4 is an equivalent circuit according to the first embodiment.

FIG. 4 is an equivalent circuit of the circuit illustrated in FIG. 3, for receiving frequency signals. In FIG. 4, the transformer 11 and the capacitor 12 are replaced with an inductor 21. The inductor 21 and the capacitor 13 transform the input impedance of the low-noise amplifier 102. The impedance measured from the terminal 11A is the conjugate of the antenna 10's impedance. Therefore, signals entering from the antenna 10 will be transmitted to the low-noise amplifier 102 effectively.

Next, the calculation of the transformer 11's impedance will be described with reference to FIG. 5.

Figure 5:
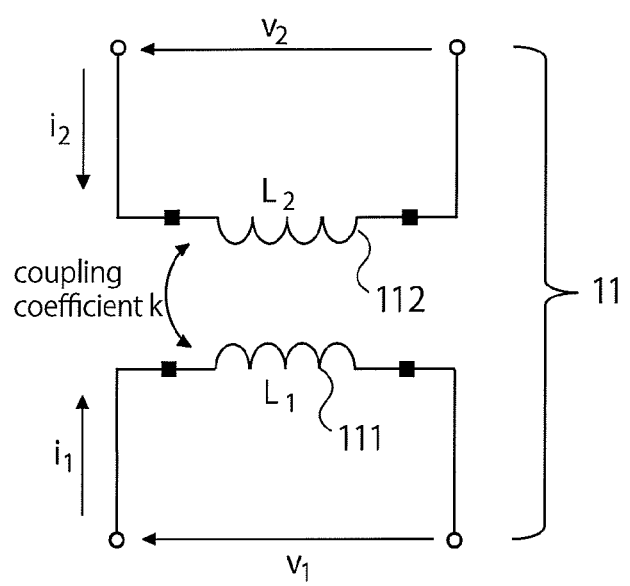
FIG. 5 is an implementation of transformer according to the first embodiment.

FIG. 5 is a schematic of the transformer 11. The current flowing the inductor 111 is $i_1$ and the current flowing the inductor 112 is $i_2$. The inductance of the inductor 111 is $L_1$ and the inductance of the inductor 112 is $L_2$. The mutual inductance between the inductor 111 and the inductor 112 is M. If the voltage between both edges for the inductor 111 is $v_1$ and the voltage between both edges for the inductor 112 is $v_2$, the values of $v_1$ and $v_2$ can be described according to the following equations (2) and (3), using the values mentioned above.

$$v_1 = j\omega(L_1 i_1 + M i_2) \qquad (2)$$

$$v_2 = j\omega(L_2 i_2 + M i_1) \qquad (3)$$

Here, $\omega$ is the angular frequency of the current.

The mutual inductance (4) can be described according to the following equation (4).

$$M = k\sqrt{L_1 L_2} \qquad (4)$$

Here, k is the coupling coefficient.

The impedance of the actual inductors 111 and 112, include resistive components besides the inductance. Let the resistive component of the inductor 111 and the inductor 112 be $R_1(\omega)$ and $R_2(\omega)$, respectively. If the quality factor of the inductor 111 and the inductor 112 is Q, the resistive components $R_1(\omega)$ and $R_2(\omega)$ can be described according the following equations (5) and (6), using the quality factor equation Q=$\omega$ L/R.

$$R_1(\omega) = \frac{\omega L_1}{Q} \qquad (5)$$

$$R_2(\omega) = \frac{\omega L_2}{Q} \qquad (6)$$

Figure 6:
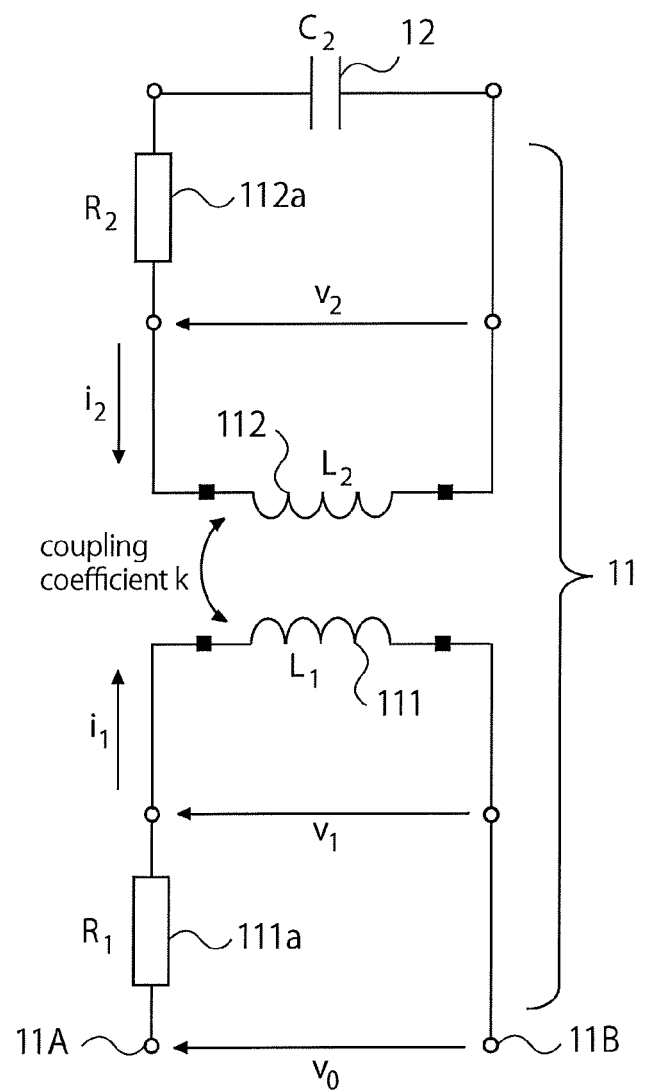
FIG. 6 is an implementation of transformer connected to a capacitor according to the first embodiment.

FIG. 6 is a schematic where a resistive component 111a, resistive component 112a and the capacitor 12 are added to the schematic in FIG. 5. The schematic in FIG. 6 corresponds to the components of the receiving circuits illustrated in FIG. 3 and FIG. 4, except the capacitor 13. The following equation (7) is the impedance Z between the terminals 11A and 11B.

$$Z = \frac{v_0}{i_1} = R_1 + \frac{v_1}{i_1} = \frac{\omega L_1}{Q} + j\omega L_1\left(1 + \frac{k^2 X}{1 - X + jX/Q}\right) \qquad (7)$$

Here, the relation X=$\omega^2 L_2 C_2$ holds.

The real part of impedance Z is described in equation (8) below. The imaginary part of impedance Z is described in equation (9) below.

$$\text{Re}(Z) \equiv R_c = \omega L_1\left(\frac{1}{Q} + \frac{k^2 X Q}{(1-X)^2 Q^2 + X^2}\right) \qquad (8)$$

$$\text{Im}(Z) \equiv L_c = \omega L_1\left(1 + \frac{k^2 X(1-X) Q^2}{(1-X)^2 Q^2 + X^2}\right) \qquad (9)$$

The equation (9) implies that if X is equal to or less than 1, the imaginary part of impedance Z takes a positive value. Therefore, if X is equal to or less than 1, the impedance Z becomes inductive.

The following equation (10) is the quality factor of the circuit illustrated in FIG. 6, calculated by using the equations (8) and (9).

$$Q_z = \frac{\text{Im}(Z)}{\text{Re}(Z)} = Q \cdot \frac{(1-X)^2 Q^2 + X^2 + k^2 X(1-X) Q^2}{(1-X)^2 Q^2 + X^2 + k^2 X^2 Q^2} \qquad (10)$$

Here, $Q_z$ is the quality factor of impedance Z.

The following equation (11) is the value of $Q_z$ (the quality factor of circuit illustrated in FIG. 6) when X=1 holds. The following equation (11) is calculated by using equation (10).

$$Q_z = \frac{Q}{1 + k^2 Q^2} \approx \frac{1}{Q} \qquad (11)$$

Since the quality factor is commonly a number greater than 1, $Q_z$ will be less than 1 when X=1 holds. Thus, if X=1, the impedance Z between the terminals 11A and 11B will have a relatively large resistive component $R_c$.

The following equation (12) describes $Q_z$ when X is equal to or less than 0.5. Equation (12) is calculated from equation (10).

$$Q_z \approx Q \cdot \frac{(1-X)^2 Q^2 + k^2 X(1-X) Q^2}{(1-X)^2 Q^2 + k^2 X^2 Q^2} = Q \cdot b \qquad (12)$$

If X<=0.5 the relation X(1-X)>$X^2$ holds. In this case, the value of b in equation (12) will be greater than 1. Therefore, the relation Qz>Q will hold, implying that if the circuit illustrated in FIG. 6 is used, the quality factor would take a greater value compared to cases when only the inductor 111 or the inductor 112 is used.

According to the discussion above, the impedance of circuit and quality factor depends on the value of X. Next, the design of circuits using the value of X is explained.

Figure 7:
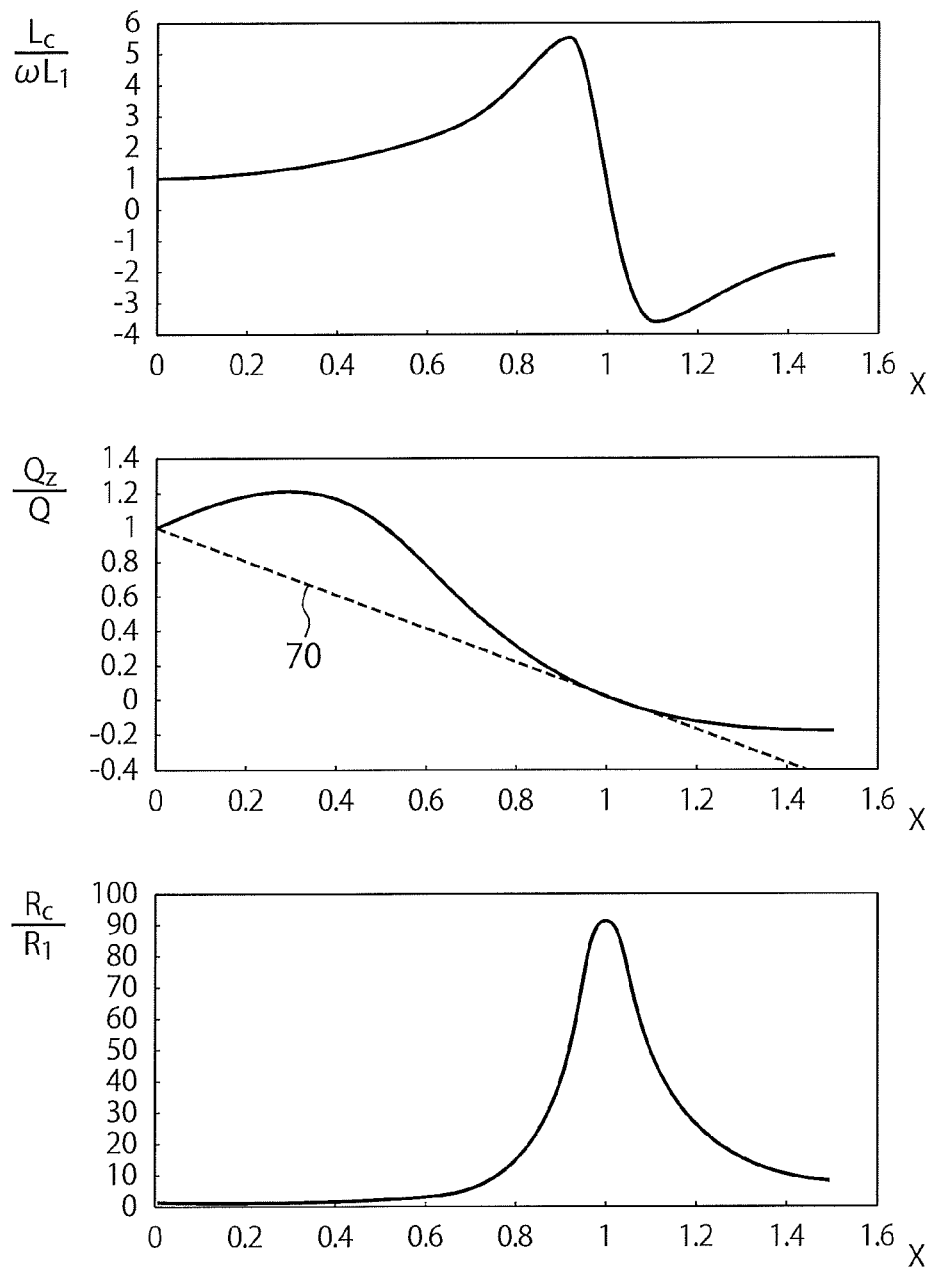
FIG. 7 shows inductance, quality factor and resistance of circuit according to the first embodiment.

FIG. 7 illustrates the graphs for the inductive component $L_c$, the quality factor $Q_z$ and the resistive component of the circuit illustrated in FIG. 6. The graphs are based of values calculated when Q=10 and k=0.95 holds. The horizontal axes represent the value of X. The values represented in the vertical axes are normalized using the corresponding values for the inductor 111.

For example, in the top graph of FIG. 7, the vertical axis is $L_c/\omega L_1$ which is normalized using the inductance ($\omega L_1$) of the inductor 111. For the middle graph of FIG. 7, the vertical axis is $Q_z/Q$ which is normalized using the quality factor of the inductor 111. For the bottom graph of FIG. 7, the vertical axis is $R_c/R$ which is normalized using the resistive component of the inductor 111.

The curves drawn with solid lines in FIG. 7 represent the characteristics of the circuit according to the embodiment. The curve drawn with broken likes in the middle graph of FIG. 7 represent the quality factor of the circuit according to the related art. Referring to the middle graph of FIG. 7, it is possible to set the quality factor to a greater value for the circuit according to the embodiment. Therefore, if the circuit according to the embodiment is used, it is possible to selectively reject image frequency elements within the received signals.

Since the value of X is proportional to $\omega^2$, the higher the frequency of received signals are, the greater the value of X would be. It is possible to design the circuit illustrated in FIG. 6 using the characteristics shown in the graphs of FIG. 7.

Suppose that the baseband frequency $f_{BF}$ is equal to $f_i=|f_r-f_{LO}|$ and image frequency fi is greater than the receiving frequency $f_r$, using the frequency $f_i=f_h=f_r+f_{LO}$. ($f_r<f_i$) In this case, the value of X calculated from the image frequency $f_i$ will be greater than the value X calculated from the receiving frequency $f_r$.

When the relation $f_r<f_i$ holds, the bottom graph of FIG. 7 (the resistive factor $R_c$ of the receiving circuit) can be used. The inductance $L_2$ of the inductor 112 and capacitance $C_2$ of the capacitor 12 can be set so that the value X calculated from the receiving frequency $f_r$ is equal to or less than 0.5 and the value X calculated from the image frequency $f_i$ is equal to 1.

If the design method described above is applied, the resistive component will become small in the receiving frequency. Thus, it is possible to ensure that the received signals are heading into the low-noise amplifier 102. Whereas in the image frequency, the resistive component of the receiving circuit will become large. Therefore the image frequency elements within the receiving signal will be either reflected due to the unmatched impedance with the antenna 10 or become dissipated by the resistance components. Then, it is possible to prevent image frequency elements within the receiving signal from penetrating into the low-noise amplifier 102.

The value X to be used can be determined during the design of the wireless communication device or during the configuration of the wireless communication device. Some examples of the value X are described in the following.

In the first example, the design or configuration of wireless communication device is done so that X=1 will hold in the image frequency. In this case, the rejection of image frequency element by the wireless communication device will be maximized. In the second example, the design or configuration of wireless communication device is done so that X=0.3 will hold in the receiving frequency $f_r$. In this case, the quality factor for the receiving frequency $f_r$ elements will be maximized, improving reception sensitivity. In the third example, the value X will be set to a value between the first example and the second example. The value of X is determined based on the requirements for the rejection performance of image frequency elements and the reception sensitivity. The values of X described above are only examples. Other values can be used for X as well.

The graphs represented in FIG. 7 can be calculated by circuit simulation. Therefore, even if frequency hopping is causing the use of multiple frequencies, it is possible to design the circuit regarding to the embodiment with little difficulty.

The adjustment of parameters for the inductance $L_1$, $L_2$ and the capacitance $C_2$ can be done during the design phase of the wireless communication device 1. It can be also done after the production of the wireless communication device 1. If variable inductors or variable capacitors are used, it is possible to change the parameters within a certain range, even after the wireless communication device 1 is manufactured. Specific configurations of the variable inductors and variable capacitors are mentioned later.

The adjustment of parameters for the variable inductors and variable capacitors can be executed by the controller 152 of the wireless communication device 1. The adjustment of parameters can be synchronized with frequency hopping or switching of radio frequencies.

The target values of parameters can be determined based on a table stored in a storage. This storage can be implemented in the controller 152, for example. This storage can be volatile memory devices such as registers, SRAM, DRAM or the like. This storage can also be non-volatile memory devices such as NAND, MRAM, FRAM, EFUSE or the like. Storage devices such as HDD, SSD or the like can be used.

Values such as X, the quality factor $Q_z$ corresponding to the receiving circuit of each value X, the impedance Z of the receiving circuit or the resistive component $R_c$ of the receiving circuit can be stored in the table. Here, the relation $X=\omega^2 L_2 C_2$ holds. Below, a case when the resistive component $R_c$ in the image frequency $f_i$ needs to be maximized is explained.

For example, say it was X=1.0 when the resistive component $R_c$ takes the maximum value, according to the table. If the capacitor 12 is a variable capacitor and the inductance $L_2$ of the inductor 112 is fixed, it is possible to make the resistive component $R_c$ large at image frequency $f_i$ by adjusting the capacitance of the capacitor 12. In this case, it is possible to calculate the target value of capacitance for the capacitor 12 by using the equation, $C_2=X/(\omega^2 L_2)=(1.0)/(4\pi^2 f_i^2 L_2)$. If the inductance of the inductor 112 is variable, it is possible to do the calculations for different values of $L_2$ to determine the target value of $C_2$ and $L_2$.

The procedures executed when the resistive component $R_c$ for the receiving frequency $f_r$ needs to be minimized or when the value of $Q_z$ for image frequency fi needs to be maximized are similar to the aforementioned procedures.

By using the receiving circuit according to the embodiment, it is possible to selectively reject undesired frequency elements including image frequency. It is possible to set the quality factor to a value higher than that of on-chip image rejection filters according to the related art. The receiving circuit according to the embodiment has an impedance matching function for received signals. Therefore, if the receiving circuit of the embodiment is inserted before the amplifier of the received signal, it is possible to prevent degraded performance of the amplifier and degraded reception sensitivities.

A transformer is used in the receiving circuit according to the embodiment. When a transformer is located on the wafer, some surrounding space cannot be used for wiring. However, since the area of the transformer is approximately 1.3 times greater than a single inductor, the consumption of circuit area will be smaller compared to cases when two inductors are used.

In the explanation above, the receiving circuit according to the embodiment was used for eliminating the image frequency elements. However, the rejection of image frequency is only an example. Other noise elements including thermal noise, interfering waves or the like can be rejected.

(First Variation)

The configuration of a receiving circuit according to a first variation is similar to the configuration of the first embodiment. However, in the first variation, a different method is used for circuit design and adjustment of parameters.

The capacitor 12 and the inductor 112 are connected in parallel for the receiving circuit 101 illustrated in FIG. 3. Thus, depending on the frequency of the signals entering the receiving circuit 101, the capacitor 12 and the inductor 112 form a parallel-resonant circuit. In a parallel-resonant circuit, the impedance becomes the greatest in the resonant frequency.

If the resonant frequency of the parallel-resonant circuit described above corresponds with the frequency of undesired frequency elements including the image frequency, it is possible to prevent the undesired frequency elements from penetrating into the low-noise amplifier 102.

In actual circuits, factors such as parasitic capacity, parasitic inductance, parasitic resistance or the like exist. Therefore, the maximum impedance of the receiving circuit 101 will not necessary correspond to the theoretical resonant frequency of a circuit with the capacitor 12 and the inductor 112 connected in parallel. Thus, it is possible to determine the parameters of each circuit element by using methods such as computer simulation.

(Second Variation)

Configuration of a receiving circuit according to a second variation is similar to the configuration of the first embodiment. However, in the first variation, a different method is used for circuit design and parameter adjustment.

In the second variation, the receiving circuit is designed so that the quality factor of the transformer 11 becomes the greatest in the receiving frequency $f_r$. This can be done by adjusting the parameter of at least either the inductor 111, the inductor 112 or the capacitor 12. If the quality factor of the transformer 11 is maximized, the resistive component of the transformer 11 is minimized. Thus, the receiving frequency $f_r$ elements within the signal proceed into the low-noise amplifier 102, efficiently.

For the calculation of the quality factor of the transformer 11, the aforementioned equation (10) can be used, for example. Graphs shown in FIG. 7 can be used for adjusting the parameters of the circuit elements. Referring to the graph shown in the middle of FIG. 7, the parameters of the inductor 112 and the capacitor 12 can be adjusted so that the value X in the receiving frequency $f_r$ is set to 0.3.

In the receiving circuit according to the second variation, the highest priority is improving the noise factor and the gain of the low-noise amplifier 102 for receiving frequency $f_r$. Whereas in the first variation, the highest priority is the elimination of undesired frequency elements.

Second Embodiment

If the receiving circuit according to the first embodiment is applied to actual wireless communication devices, some components may be altered or added. A receiving circuit according to a second embodiment is the receiving circuit according to the first embodiment with some additions and replacements of components. The use receiving circuit according to the second embodiment is practical in actual applications.

Figure 8:
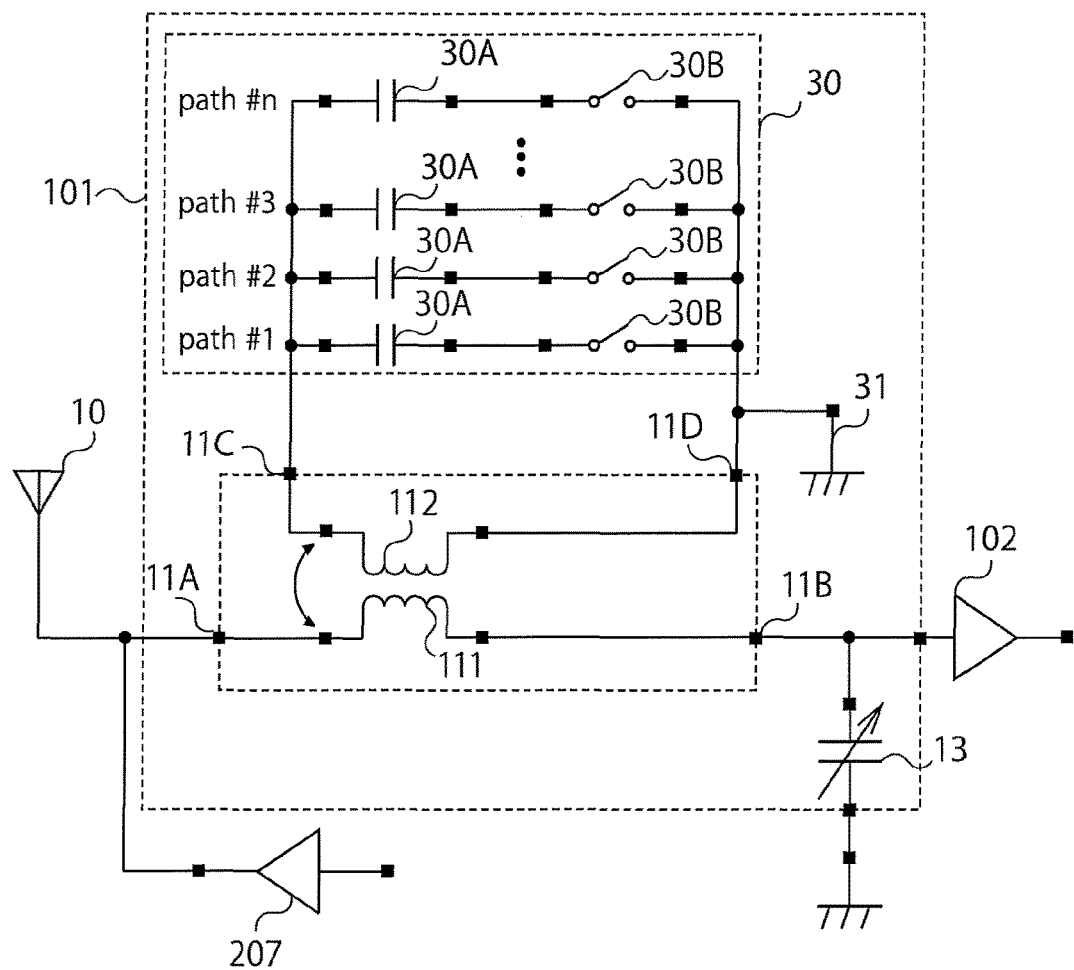
FIG. 8 is an implementation of circuit according to a second embodiment.

FIG. 8 is an implementation of circuit according to a second embodiment. Below, a circuit will be described with reference to FIG. 8, focusing mainly on the differences compared to the circuit according to the first embodiment.

The basic configuration of the receiving circuit according to the embodiment is the same as the receiving circuit of the first embodiment, except the following differences. The first difference is the replacement of the capacitor 12 in the first embodiment with a capacitor bank 30. The second difference is the connection of the terminal 11D to ground via a wiring 31. Examples of the ground include the reference potential of the whole circuit or the reference potential of the analog circuit.

The capacitor bank 30 includes a plurality of paths with a capacitor 30A and a switch 30B connected in series. For the switch 30B, semiconductor switches such as MOS transistors, diodes, Junction Field-Effect Transistors (JFETs) or the like can be used. The switch 30B may be implemented with other circuit elements or combination of elements. Any implementation can be used for the switch 30B. The ON/OFF operations of the switch 30B is executed by the controller 152 in the wireless communication device 1.

The capacitor bank illustrated in FIG. 8 has n paths including path #1, path #2, path #3 to path #n. The number of paths can be any number greater than one.

Wireless communication devices with antennas shared for both the transmission and the reception of signals may have switches that shift the connection of antenna between the receiving circuit and the transmission circuit. If a selector switch is used, the receiving circuit can be protected from high voltage even if the output value of the power amplifier used for amplifying transmitted signals is high.

Generally, if a switch is allocated between the antenna and the receiving/transmission circuits, performance would be compromised due to the insertion loss. The reception sensitivity and efficiency of transmission will be reduced. Thus, the power consumption of the power amplifier would increase. Taking the above factors into account, it becomes difficult to improve the performance of the wireless communication device, if there is a selector switch behind the antenna.

For wireless communication devices with antennas shared for reception and transmission purposes, designs without the selector switch between the antenna and the circuits is desired. The embodiments of the present invention avoid the use of the selector switch behind the antenna. In the receiving circuit according to the embodiment, the switch 30B of the capacitor bank 30 is manipulated according to the reception and transmission status of the wireless communication device 1.

When the wireless communication device 1 is transmitting signals, the switches 30B for all the paths of the capacitor bank 30 is turned on. Thus, even if the voltage of the signals transmitted by the power amplifier 207 is exceeding the dielectric strength of the switch 30B, the breakdown of the switch 30B can be avoided. The dielectric strength of the switch 30B can be the absolute maximum rating of a MOS transistor, for example. The protective feature described above enables the use of the power amplifiers 207 with high output values, increasing the upper limit of transmission power.

When the wireless communication device 1 is receiving signals, the switches 30B of some of the paths of the capacitor bank 30 can be turned on. Whereas the switches 30B for rest of the paths can be turned off. By the selection of the switches 30B that are turned on or off, it is possible to adjust the capacitance of the capacitor bank 30. The switch 30B that is turned on or off can be specified based on the number of switches or the path number. By using the method described above, it is possible to adjust the quality factor, the resistive component of the receiving circuit, the resonant frequency or the like, based on the receiving frequency $f_r$ and the image frequency $f_i$.

Due to process variation, chips with the identical circuits topologies commonly exhibit different characteristics. It is possible to adjust the number of the switches 30B that are turned on or off, by taking the process variation into account.

For example, it is possible to store a table including the relationship between the target capacitance value of the capacitor bank 30 and the number of the switches 30B that are turned on or off, within the storage of the controller.

If the sizes of each of the capacitors 30A are nearly identical, it is possible to use an equation that takes the target value of capacitance as a parameter and provides the number of the switches 30B that are turned on or off. By adjusting the values stored in the tables or the parameters within the equation, it is possible to absorb the difference between the chips due to process variation. Depending on conditions, it is possible to turn off all the switches 30B when signals are received. It is also possible to turn on all the switches 30B during reception of signals.

If frequency hopping is used, the receiving frequency and the transmission frequency are changed, periodically. Therefore, readjustment of the quality factor of the receiving circuit, the resistive component and the resonant frequency or the like is necessary. If the wireless communication device 1 is receiving signals, the ON/OFF control of the switches 30B can be synchronized with frequency hopping or the switching of radio frequencies.

If the capacitance $C_2$ of the capacitor 12 according to the first embodiment is replaced with the capacitance of the capacitor bank 30 described above, it is possible to perform the parameter adjustments mentioned in the first embodiment. Thus, by adjusting the capacitance of the capacitor bank 30, it is possible to maximize the resistive component $R_c$ for the image frequency $f_i$. It is also possible to minimize the resistive component $R_c$ for receiving frequency $f_r$ or maximize the value of $Q_z$ for the image frequency $f_i$.

By using the receiving circuit according to the second embodiment, it is possible to protect the receiving circuit from high voltage signals transmitted from the power amplifier 207 even without a selector switch located between the antenna and the circuits.

Third Embodiment

In the receiving circuit according to the second embodiment, the switches in the capacitor bank were protected from the voltage of signals transmitted from the power amplifier. A receiving circuit according to a third embodiment can be used when the output of the power amplifier is higher and the low-noise amplifier for receiving signals needs to be protected from high voltage.

Figure 9:
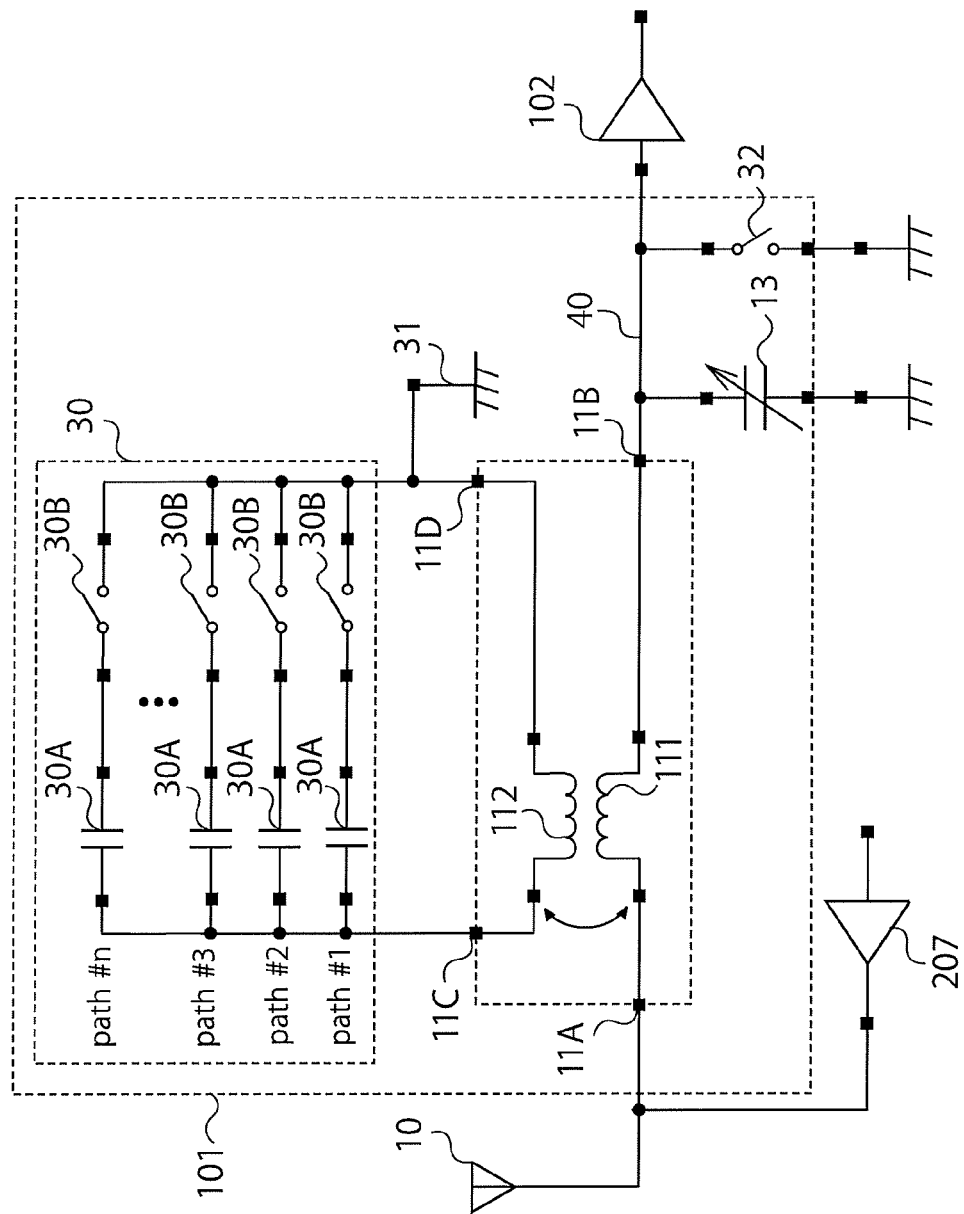
FIG. 9 is an implementation of circuit according to a third embodiment.

FIG. 9 is an implementation of circuit according to a third embodiment. Below, a circuit according to the embodiment will be described with reference to FIG. 9.

In order to avoid breakdown of the low-noise amplifier 102, a switch 32 is located in the wiring connected between the input of the low-noise amplifier 102 and the ground. The other components are similar to the receiving circuit according to the second embodiment. Semiconductor switches such as diodes, Junction Field-Effect Transistors (JFETs) or the like can be used. The switch 32 can be implemented with other circuit elements or a combination of circuit elements. Any form of implementation can be used for the switch 32.

For scaled-down CMOS process, the absolute maximum rating for gate voltage is higher than that of the drain-source voltage. Therefore, if the maximum output voltage of the power amplifier 207 is lower than the absolute maximum rating for the gate voltage of MOS transistors used in the low-noise amplifier 102, extra protection is not needed.

However, if the maximum output voltage of the power amplifier 207 is greater than the absolute maximum rating for the gate voltage of MOS transistors used in the low-noise amplifier 102, the low-noise amplifier 102 may breakdown when the wireless communication device 1 is transmitting signals. To avoid this, a circuit illustrated in FIG. 9 may be used.

The controller of the wireless communication device 1 turns off the switch 32 when the wireless communication device 1 is receiving signals from the antenna 10. Also, the controller of the wireless communication device 1 turns on the switch 32 when the wireless communication device 1 is transmitting signals from the power amplifier 207.

Fourth Embodiment

Figure 10:
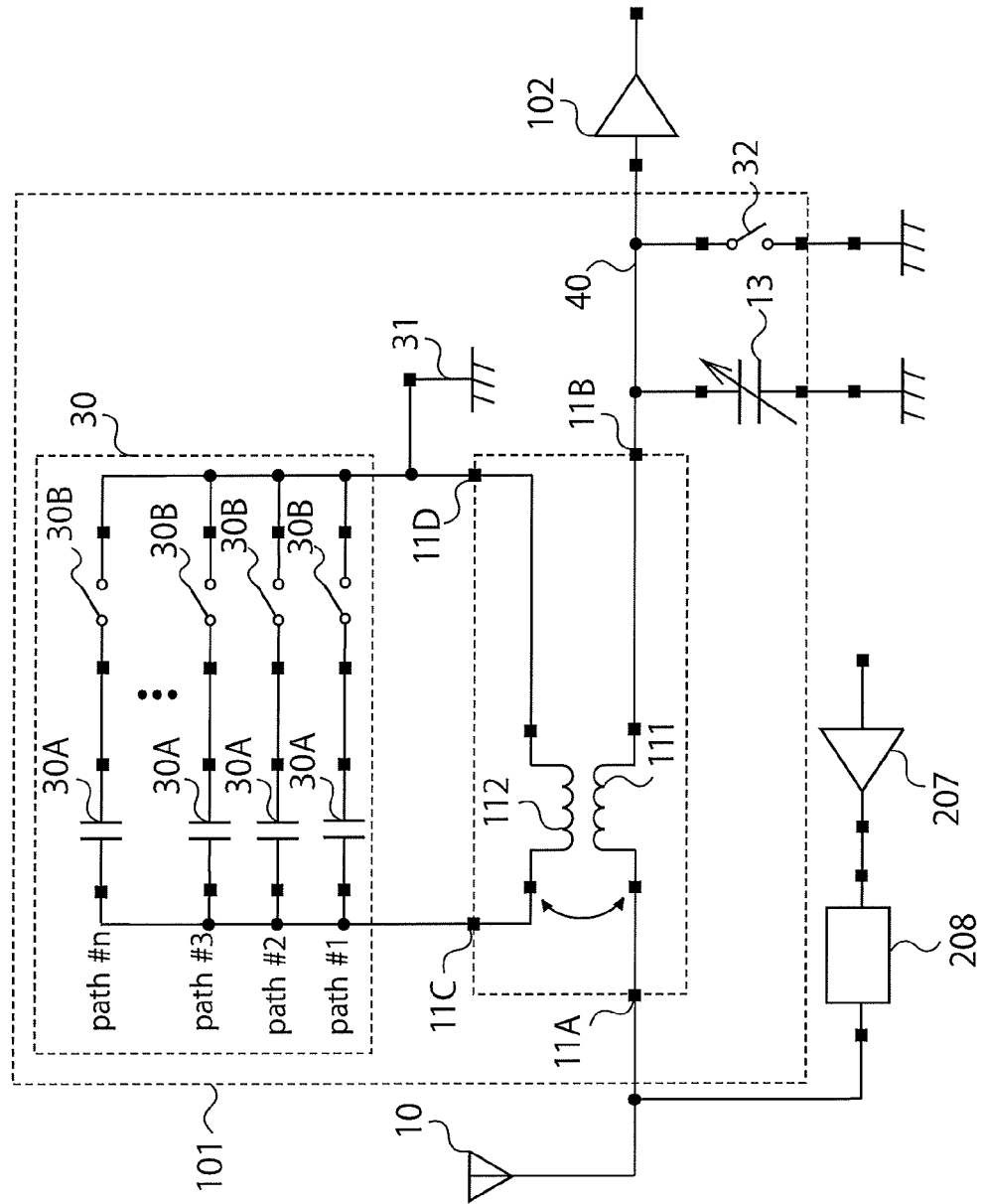
FIG. 10 is an implementation of circuit according to a fourth embodiment.

In a fourth embodiment, the input impedance of the receiving circuit is adjusted to prevent the transmitted signals from penetrating into the receiving circuit. FIG. 10 is an implementation of circuit according to a fourth embodiment. Except the transmission matching circuit 208 located between the power amplifier 207 and the antenna 10, the circuit illustrated in FIG. 10 is similar to the circuit according to the third embodiment.

If the impedance of the power amplifier 207 and the antenna 10 is not matching, the transmission matching circuit 208 needs to be located between the power amplifier 207 and the antenna 10 for impedance matching. However, since the antenna is shared for both transmission and reception of signals, the following two conditions need to be met, if a configuration without selector switches is used.

The first condition that needs to be met is; the impedance of the transmission matching circuit 208 is higher than the impedance of the receiving circuit measured from the terminal 11A. If this condition is met, the receiving frequency $f_r$ signals will enter the receiving circuit, not the transmission matching circuit 208 when the wireless communication device 1 is receiving signals. To fulfill this condition, the circuit needs to be designed so that the impedance of the transmission matching circuit 208 takes a large value for receiving frequency $f_r$.

The second condition that needs to be met is; the impedance of the receiving circuit measured from the terminal 11A is higher than the impedance of the antenna 10. If this condition is met, transmission frequency $f_t$ signals will enter the antenna 10, not the receiving circuit, when the wireless communication device 1 is sending signals. To fulfill this condition, the circuit needs to be designed so that the impedance of the receiving circuit takes a large value for transmission frequency $f_t$.

For the circuit according to the embodiment, the switches 30B for all the paths in the capacitor bank 30 are turned on when the wireless communication device 1 is transmitting signals. When the power amplifier 207 is transmitting signals, the configured capacitance of the capacitor bank 30 will be equal to the sum of capacitance for the capacitors 30A in all the paths.

The impact of the receiving circuit to transmission of signals can be minimized if the parameters of elements within the receiving circuit are adjusted so that the impedance of the receiving circuit measured from the terminal 11A is maximized for transmission frequency $f_t$. At least either the capacitance of the capacitor bank 30, the inductance of the inductor 111 or the inductance of the inductor 112 can be adjusted to ensure that a parallel-resonant circuit is formed for signals of transmission frequency $f_t$. Thus, it is possible to minimize leakage of signals transmitted from the power amplifiers into the receiving circuit. The signals to be transmitted can proceed to the antenna 10 efficiently.

By adjusting circuit parameters, the second condition described above can be met, alleviating the difficulty of circuit design for wireless communication devices.

For variable capacitors described in the above embodiments, devices with layers of ferroelectrics and electrodes can be used, for example. Variable capacitors can be other devices. If the capacitance is variable, any type of device or configuration can be used. If a table storing the relation between the voltages applied to the variable capacitor and the capacitance is used, it is possible to adjust the capacitance of the variable capacitor to a certain target value. The tasks described above can be handled by a controller coupled with each variable capacitor. The controller of the whole circuit can execute the aforementioned tasks as well.

Fifth Embodiment

In the embodiments described above, values such as the quality factor or the resonant frequency were configurable by adjusting the parameters of circuit elements. For each embodiment, it is possible to use inductors with adjustable inductance. In a fifth embodiment, an example of a variable inductor is described.

Figure 11:
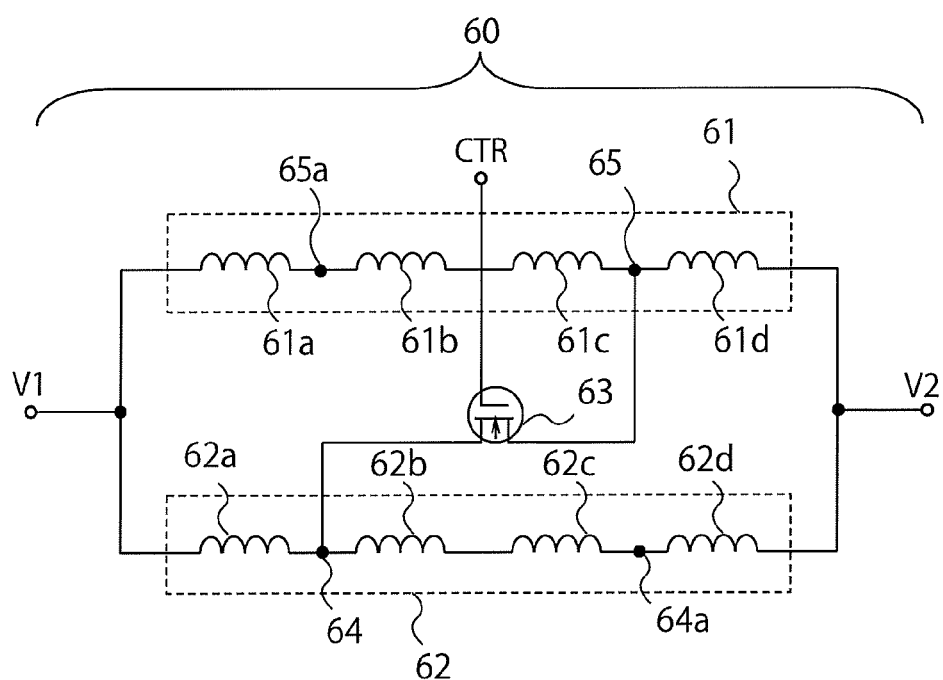
FIG. 11 is an implementation of a variable inductor.

FIG. 11 is an implementation of a variable inductor. A variable inductor according to a fifth embodiment will be described with reference to FIG. 1.

In FIG. 11 a variable inductor 60 is illustrated. The variable inductor 60 includes an inductor series 61 and an inductor series 62. The ends of the inductor series 61 and the inductor series 62 are connected to a terminal V1 and a terminal V2, respectively. Although the inductor 60 is a circuit, it operates as a single inductor as a whole. The inductor series 61 includes an inductor 61a, an inductor 61b, an inductor 61c and an inductor 61d connected in series. Similarly, the inductor series 62 include an inductor 62a, an inductor 62b, an inductor 62c and an inductor 62d connected in series. In the example illustrated in FIG. 11, eight inductors are shown. However, a greater number of inductors can be used to implement a variable inductor.

A node 65 located between the inductor 61a and the inductor 61b is connected to the drain of a MOSFET 63. A node 64 located between the inductor 62a and the inductor 62b is connected to the source of the MOSFET 63. The MOSFET 63 acts as a switch between the node 64 and the node 65. Depending on the voltage applied to terminal CTR, it is possible to make the source-drain of the MOSFET 63 conductive or non-conductive. In the example illustrated in FIG. 11, a NMOSFET is used. However, it is also possible to use PMOSFETs, bipolar transistors or CMOS circuits to implement a switch. The implementation of the switching function is not limited to a specific form.

If the MOSFET 63 is turned on (conductive state), the connection of the inductors changes from cases when the MOSFET 63 is turned off (non-conductive state), lowering the inductance between the terminal V1 and the terminal V2. In the example illustrated in FIG. 11, there is only one switch (MOSFET) between the nodes. However, multiple switches can be allocated between nodes.

For example if another switch is located between a node 64a and a node 65a of FIG. 11, four different connections of inductors are possible. Thus, if the number of switches between the nodes is increased, the number of configurable inductance values increases. By increasing the number of inductors and the switches, the value of inductance can be adjusted in finer granularities.

The variable inductor illustrated in FIG. 11 is only an example. Variable inductors of different configurations and forms can be used as well.

The terms used in this embodiment should be interpreted broadly. For example, the term "processor" may include a general-purpose processor, a central processor (CPU), a microprocessor, a digital signal processor (DSP), a controller, a micro-controller, and a state machine. Depending on situations, the "processor" may indicate an application specific integrated circuit, a field programmable gate array (FPGA), a programmable logic circuit (PLD), and the like.

The "processor" may indicate a combination of processing devices such as a plurality of microprocessors, a combination of a DSP and a microprocessor, and one or more microprocessors cooperating with a DSP core.

As another example, the term "memory" may include any electronic component capable of storing electronic information. The "memory" may indicate a random access memory (RAM), a read only memory (ROM), a programmable read only memory (PROM), an erasable programmable read only memory (EPROM), an electrically erasable PROM (EEPROM), a nonvolatile random access memory (NVRAM), a flash memory, and a magnetic or optical data storage. A "memory" can be read from a processor. If the processor performs read operations, write operations or read and write operations to the memory, the memory can be considered to be electrically communicating with the processor. The memory can be integrated with the processor. In such cases as well, the memory can be considered to be electrically communicating with the processor.

The term "storage device" or "storage" may include any device that can store data using magnetic technology, optical technology, or nonvolatile memory. For example, the storage can be a HDD, an optical disk, a SSD, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A receiving circuit comprising:
   a transformer including a first inductor in a primary side and a second inductor in a secondary side, wherein the first inductor includes a first terminal and a second terminal, the second inductor includes a third terminal and a fourth terminal, and the first terminal configured to couple with an antenna for receiving a first electrical signal corresponding to an electromagnetic wave received by the antenna, and the second terminal configured to output a second electrical signal based on the first electrical signal;
   a capacitor including a fifth terminal coupled to the third terminal and a sixth terminal coupled to the fourth terminal; and
   an amplifier coupled to the second terminal and configured to amplify the second electrical signal.

2. The receiving circuit according to claim 1, wherein capacitance of the capacitor is variable and adjusted based on at least either a first frequency of a first signal received from the first inductor or a second frequency of a second signal to be rejected.

3. The receiving circuit according to claim 1, wherein inductance of the second inductor is variable and adjusted based on at least either a first frequency of a first signal received from the first inductor or a second frequency of a second signal to be rejected.

4. A receiving circuit comprising:
   a transformer including a first inductor in a primary side and a second inductor in a secondary side, wherein the first inductor includes a first terminal and a second terminal, the second inductor includes a third terminal and a fourth terminal, and the first terminal configured to couple with an antenna for receiving a first electrical signal corresponding to an electromagnetic wave received by the antenna, and the second terminal configured to output a second electrical signal based on the first electrical signal, and the fourth terminal connected to a ground;
a plurality of capacitors, each including a fifth terminal and a sixth terminal, the fifth terminal coupled to the third terminal;
a plurality of switches, each connected between the sixth terminal and the fourth terminal; and
an amplifier coupled to the second terminal and configured to amplify the second electrical signal.

5. A wireless communication device comprising:
the receiving circuit according to claim 4; and
a power amplifier that amplifies a transmitted signal; and
the antenna for receiving and transmitting signals, the first terminal of the first inductor connected to an output of the power amplifier or a impedance matching circuit connected between the antenna and the power amplifier.

6. The wireless communication device according to claim 5, wherein
when signals are transmitted, the plurality of switches are all turned on.

7. The wireless communication device according to claim 6, wherein
when signals are received, each of the plurality of switches to be turned off or on is determined based on at least either a first frequency of a first signal received from the first inductor or a second frequency of a second signal to be rejected.

8. The wireless communication device according to claim 6, wherein
when signals are transmitted, each of the plurality of switches to be turned off or on is determined based on impedance measured from the first terminal of the first inductor for a frequency of one of the transmitted signals.

9. The wireless communication device according to claim 7, wherein
when signals are received, each of the plurality of switches to be turned off or on is determined based on impedance measured from the first terminal of the first inductor for the first frequency of the first signal.

10. The wireless communication device according to claim 7, wherein
inductance of the second inductor is variable, and when signals are received, impedance of the second inductor is adjusted based on at least the first frequency of the first signal or the second frequency of the second signal.

11. The wireless communication device according to claim 10, wherein
when signals are transmitted, the inductance is adjusted based on impedance measured from the first terminal of the first inductor for a third frequency of one of the transmitted signals.

12. The wireless communication device according to claim 10, wherein
when signals are received, the inductance is adjusted based on impedance measured from the first terminal of the first inductor for the first frequency of the first signal.

13. The wireless communication device according to claim 7, wherein the plurality of switches are first switches, further comprising:
a second switch connected between the second terminal of the first inductor and the ground, wherein the second switch is turned on when signals are transmitted and the second switch is turned off when the signals are received.

* * * * *